2,596,341

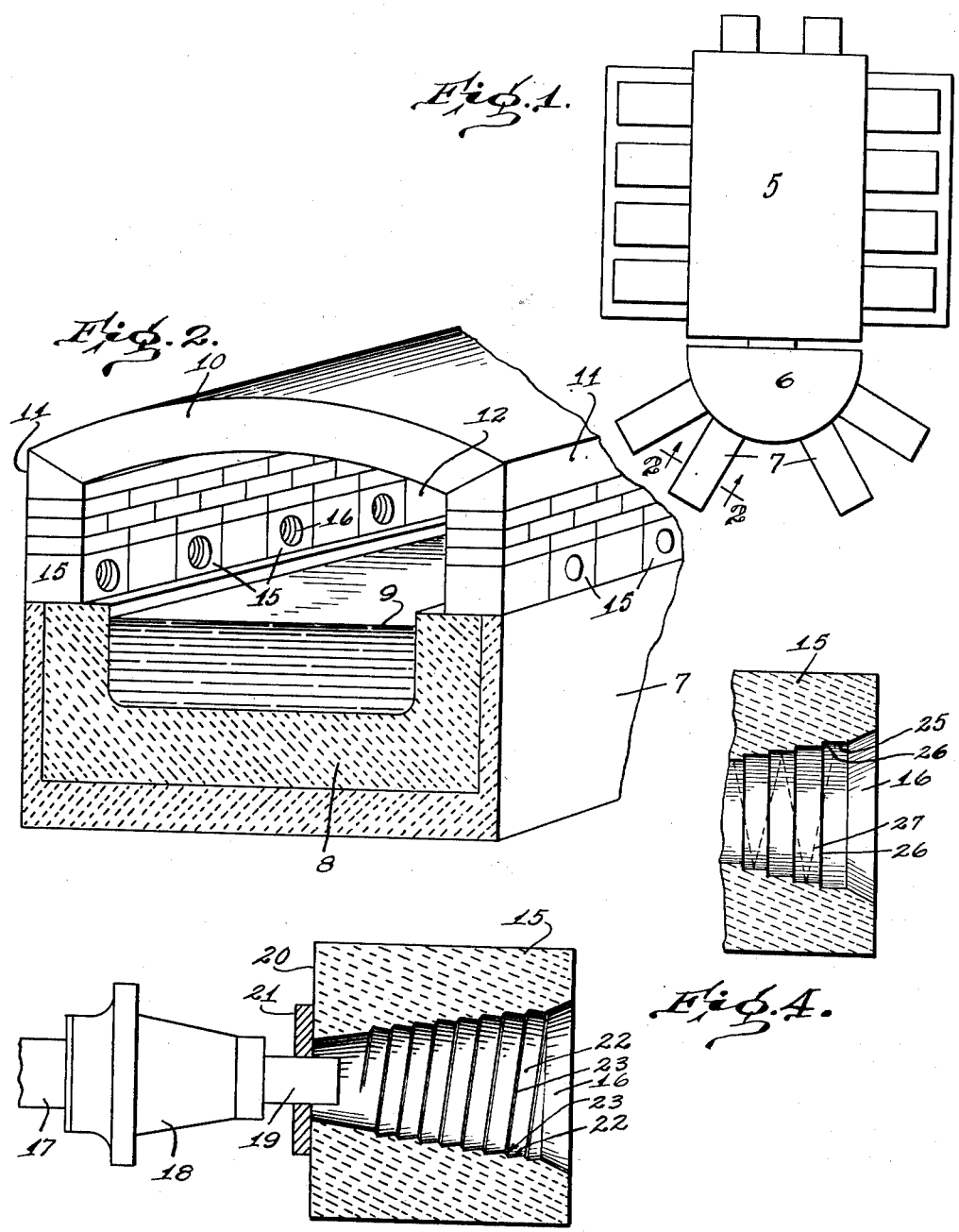
May 13, 1952  C. W. McCREERY ET AL  2,596,341
BURNER BLOCK AND BURNER
Filed March 29, 1945
INVENTORS
Cecil W. McCreery
Milton W. Hatfield
BY
Rule & Hoge,
ATTORNEYS Patented May 13, 1952

UNITED STATES PATENT OFFICE 2,596,341

BURNER BLOCK AND BURNER

Cecil W. McCreery, Toledo, Ohio, and Milton W. Hatfield, Muncie, Ind., assignors to Owens-Illinois Glass Company, a corporation of Ohio Application March 29, 1945, Serial No. 585,478

4 Claims. (Cl. 158—1)

Our invention relates to furnaces and particularly to burner blocks which are adapted to be incorporated in and form parts of the furnace walls. The invention in its preferred form as herein illustrated, comprises burner blocks of novel construction, built into the walls of a boot or forehearth of a glass furnace.

An object of the invention is to provide an improved construction of the burner blocks by which increased efficiency, better distribution of the burning gases, and better control of the distribution under varying gas pressure are obtained. The invention provides a burner block having a passageway or opening therethrough for the gases of combustion, with walls of the said opening of a novel design by which the velocity of the gases flowing along the walls is retarded in a manner to improve the action of the burner. By retarding the flow of gases in accordance with our invention, the zone of combustion is materially modified, combustion taking place to a greater extent within the burner block. In this manner the wall surfaces are heated to a high temperature resulting in more efficient combustion of the gases and a substantial reduction of gas consumption with a corresponding economy of operation.

A feature of the invention consists in so designing the wall surfaces that the radiant heat reflected therefrom is effective in heating the gases flowing through the burner block.

A further object of the invention is to provide a burner block having an opening extending therethrough for the passage of the fuel gases, with the walls of the opening flared outwardly in the direction of the movement of the gases, the said opening serving as a combustion chamber and the wall surfaces of the opening being so formed that the major portion of the heat rays reflected back and forth between the walls are biased toward the intake end of the chamber, thus obtaining a large amount of heat radiation within the chamber by which the gases are raised to a high temperature while still within the chamber. This results in a correspondingly greater efficiency in combustion of the gases for heating and controlling the temperature of the glass to which they are applied.

A further object of the invention is to provide a furnace incorporating a novel form of burner block by means of which an accurate control is obtained of the flame emitted from the burner, as to length, width, maximum temperature and the area or zone of application of the burning gases to the molten material being treated.

Other objects of the invention will appear hereinafter.

Referring to the accompanying drawings:

Fig. 1 is a diagrammatic plan view of a conventional glass melting and refining furnace to which the invention is applied.

Fig. 2 is a part sectional perspective view on a larger scale of a furnace boot or forehearth, the section being taken at the line 2—2 on Fig. 1.

Fig. 3 is a view of a burner including a mixing chamber and a burner block, the latter shown in section.

Fig. 4 is a fragmentary sectional view of a modified form of burner block.

Referring to Fig. 1, the furnace comprises a melting tank 5 in which the raw materials are melted, a refining tank 6 into which the molten glass flows from the tank 5, and forehearths or boots 7 through which the refined, molten glass flows to discharge outlets (not shown). Each forehearth 7 comprises a trough 8 through which the molten glass 9 flows. An arched roof 10 and side walls 11 provide a conditioning chamber or tunnel 12 in which a high temperature is maintained by burners arranged at intervals along the side walls. The burners provide means for maintaining the glass flowing through the trough 8 at a high temperature and also for regulating and controlling the temperature of the glass.

Burner blocks 15 are built into the side walls 11, with a horizontal row of the blocks extending along each wall. The burner blocks in the opposite walls are preferably arranged in staggered relation in order to obtain a substantially uniform distribution of the flames impinging on the surface of the flowing glass.

Referring to Fig. 3, the burner block is formed with a horizontally-disposed opening or conduit 16 extending therethrough and providing a passageway for the burner gases and also serving as a combustion chamber. The walls of said opening are tapered so that the form of the opening as a whole is substantially frusto-conical. Fuel gas and gas for supporting combustion, as air or oxygen, are supplied through a pipe 17 to a mixing chamber 18 from which the mixed gases are discharged through a nozzle 19 into the opening 16. The nozzle, as shown, projects a short distance beyond the outer wall surface 20 of the burner block into the chamber 16 at the restricted end thereof. The plate 21 provides a seal between the nozzle and the chamber 16.

The interior wall surface of the combustion chamber 16 throughout the major portion of its length is in the form of a spiral. The form of this spiral surface is such that the wall as viewed in cross section (Fig. 3) has a saw-tooth contour, each saw-tooth outlining a convolution of the spiral. Each saw-tooth comprises a straight edge; said edges outlining the major surface 22 of the spiral and extending approximately parallel with the axis of the spiral. A comparatively narrow spiral surface or shoulder 23, approximately perpendicular to the surface 22, connects the adjoining convolutions of the spiral surface 22. The purpose of this particular formation of the chamber walls will be pointed out hereinafter.

The major spiral surface 22 as shown in Fig. 3 may be considered as made up of a series of ring-like surface portions which encompass the frusto-conical opening and thus provide reflecting surface portions encircling the opening. Each of the adjoining convolutions or turns of the spiral surface 22 completely surrounds the axis of the frusto-conical opening, the spiral surface 22 as a whole being made up of these adjoining convolutions.

Fig. 4 illustrates a slightly modified form of the walls of the combustion chamber. As here shown, a burner block 15' is formed with a chamber 16' in which a series of coaxial annular wall surfaces 25 are substituted for the continuous spiral surface 22 shown in Fig. 3. The surfaces 25 are parallel or approximately parallel with the axis of the frusto-conical chamber 16'. They may be slightly flared outwardly in the direction opposite to flow of gas through the chamber. Narrow surfaces 26 substantially perpendicular to the axis of the chamber 16', unite adjoining surfaces 25.

The operation of the burner will now be described and certain results and advantages attained by the particular construction and wall formation of the combustion chamber in the burner block will be pointed out. The combustible gases are supplied under pressure through the mixing chamber and discharged through the nozzle 19 into the combustion chamber or conduit 16. The movement of the gases, and particularly of the outer layers or strata moving along the walls of the combustion chamber, is retarded, owing to the saw-toothed or stepped formation of the wall surfaces, to a much greater extent than with a conventional smooth continuous surface. This appears to be due mainly to the partial vacuum which is created in the pockets formed by the wall surfaces 25 and 26 (Fig. 4) of each section, or the corresponding surfaces 22 and 23 (Fig. 3) of each convolution of the spiral. The partial vacuum operates by suction to retard the flow of gases along the surfaces of the combustion chamber.

As a result the combustion or burning of the mixed gases is initiated and developed to a large extent within the confines of the burner block, instead of the gases being carried entirely through the block and burned largely within the conditioning chamber 12 as takes place in the use of conventional burners having straight smooth walls. It will be noted that the saw-tooth angles are so designed that the gases, which are injected with considerable velocity at the vertex or intake end of the frusto-conical conduit 16, will flow over the angles or edges uniting the smooth surfaces 22 with the abrupt surfaces 23 in a manner to create a vacuum or rarefied condition at the surfaces 23 in addition to promoting a high degree of gas friction, thereby holding or exerting a back pull on the outer strata of the combustible gases moving along the surface walls of the channel, thus definitely retarding their movement.

As a result of the retarded flow of the gases along the chamber walls, the combustion commences nearer to the intake end or vertex of the chamber than it would with a conventional straight wall surface and is also carried on to a higher degree. The combustion initiated near the entrance of the chamber continues with increasing magnitude as the gases advance and until they escape at the discharge end of the chamber. Due to this combustion of the gases flowing over and in contact with the saw-tooth surfaces, the latter are heated to a high degree. This heating is further augmented by reason of the saw-tooth formation increasing the surface area exposed to the burning gases. The result is to raise the temperature of the wall surfaces to a degree approximating the maximum obtainable with the specific gases employed. The temperature is highest at the saw-tooth points where the adjoining surfaces 25 and 26 (Fig. 4) meet.

The wall surfaces being heated to a high temperature or to incandescence cause a large amount of heat to be reflected back and forth by radiation diametrically across the chamber 16 or through the axis thereof. The particular shape of the wall surfaces has a very important effect in controlling and directing the reflected heat rays. Thus, for example, a heat ray as indicated by the broken line 27 (Fig. 4) may be reflected from a ring surface 25 adjacent the outlet of the chamber and directed against the adjoining ring surface, and further reflected back and forth diametrically across the chamber in a zigzag path extending toward the vertex of the frusto-conical chamber.

It will be observed that in order to permit reflection of heat rays back and forth in such a path, the wall surfaces 25 must be parallel or approximately parallel with the axis of the chamber 16. With straight flared walls converging toward the inlet of the chamber, any heat rays reflected back and forth across the channel would be rapidly deflected away from the inlet, the angle of reflection at each succeeding point of contact being increased in a geometric ratio. To prevent such deflection of the heat rays away from the inlet, the wall surfaces 25 are made individually non-divergent in the axial direction extending away from the burner, that is, the direction in which the frusto-conical opening through the burner block is divergent. By making the wall surfaces parallel with the axis of the chamber or slightly convergent toward the outlet, the reflection of the heat rays is given a bias toward the intake end of the chamber. In the form of the burner block shown in Fig. 3, the individual annular surfaces of which the spiral surface 22 consists, are also non-divergent in the axial direction in which the opening through the burner block is divergent and function in the same manner as the corresponding surfaces 25 of Fig. 4.

The parallel or substantially parallel wall surfaces 25 result in a large amount of heat radiation within the chamber of the burner block, the heat rays serving to raise the temperature of the entire volume of gas within the chamber to a high degree. Because of the high radiation within the burner block chamber penetrating thoroughly all of the gases injected, such radiation being distributed along the passageway, the combustion is at or near its maximum by the time the gases have passed through the burner block and are emitted into the furnace chamber 12.

Owing to the retarding action of the gases produced by the stepped formation of the chamber walls and also to the intensified combustion with the burner block obtained by the use of this design, an accurate and desirable control can be maintained over the flames emitted from the burner blocks. This control relates to the length and width of the flames and particularly as respects the surface areas of the flowing glass against which the flames are directed, and also the points or areas of maximum temperature. With burner blocks of the design shown, the flame from each burner block is brought close to the side walls of the channel through which the glass is flowing and spread in a manner to mingle with the flames or burning gases from adjacent burner blocks, with the result that a continuous flame of substantially uniform intensity throughout is spread over the entire surface area of the flowing glass 9.

We have found that these control features prevail with accuracy over a wide range of line pressures that might desirably be carried on the gas injector. We have found that variations in the pressure applied to the injectors does not materially vary the zones in which the combustion takes place or result in any material change in the distribution of the burning gases as applied to the glass. In this manner, we have overcome a serious objection which prevails with conventional burner blocks wherein changes in the gas pressure which are necessary for regulating the amount of heat supplied to the flowing glass, result in material changes in the areas at which the heat is applied to the glass, thus interfering with uniform heating.

Modifications may be resorted to within the spirit and scope of our invention.

We claim:

1. A furnace block having an opening therethrough of generally frusto-conical formation, the length of said opening being several times the diameter at the smaller end which forms the inlet and substantially greater than the diameter at the larger end, said opening having a spiral reflecting wall surface and being tapered outwardly from the smaller end to the larger end, the major surface portion of each individual convolution of the spiral being about parallel with the axis of the spiral and non-divergent in the axial direction in which the wall surface of the opening as a whole is divergent, so that radiation of heat is confined within the opening to such an extent that combustion is at or near its maximum by the time the gases have passed through the burner block, the longitudinal edges of adjacent said reflecting surface portions being separated by intermediate spiral surface portions at an angle to the reflecting surface portions the width of said reflecting surface portions being several times the width of the intermediate surface portions, so that the movement of gases through the opening is retarded by gas friction, the greater amount of retardation being applied to the outer layers or strata along the walls of the opening, thereby causing the combustion to commence comparatively close to the inlet.

2. A burner comprising a burner block having a frusto-conical opening extending therethrough, the length of said opening being several times the diameter at the smaller end and substantially greater than the diameter at the larger end, a burner nozzle positioned adjacent to the smaller end of said opening and arranged to direct fuel gas into said opening through said smaller end thereof, the wall surface of the opening being shaped to form a series of reflecting surface portions, each encircling said opening and alternating with intermediate connecting surface portions, the reflecting surface portions being positioned one in advance of another in a direction lengthwise of the opening, each said reflecting surface portion being about parallel with the axis of the opening and non-convergent in the axial direction in which the said opening is convergent, so that radiation of heat is confined within the opening to such an extent that combustion is at or near its maximum by the time the gases have passed through the burner block, the said reflecting surface portions being arranged in stepped relation, so that movement of gases through the opening is retarded by gas friction, the greater amount of retardation being applied to the outer layers or strata along the walls of the opening and thereby causing the combustion to commence comparatively close to the inlet.

3. The combination of a burner block formed with a frusto-conical opening extending therethrough and providing a combustion chamber, the length of said opening being several times the diameter at the smaller end and substantially greater than the diameter at the larger end, a burner comprising a nozzle positioned at the smaller end of said opening and arranged to direct fuel gases into said chamber, the wall of said chamber comprising a spiral surface consisting of a series of convolutions arranged in stepped relation so that movement of gases through the opening is retarded by gas friction, the greater amount of retardation being applied to the outer layers or strata along the walls of the opening and thereby causing the combustion to commence comparatively close to the smaller end, each convolution forming a ring-like reflecting surface portion encompassing the said opening and alternating with intermediate connecting surface portions, each said ring-like reflecting surface portion being approximately parallel with the axis of said opening and non-divergent in the axial direction in which the wall surface of the chamber as a whole is divergent so that radiation of heat is confined within the opening to such an extent that combustion is at or near its maximum by the time the gases have passed through the burner block.

4. A burner block having a frusto-conical opening extending therethrough and being tapered outwardly from the smaller end which forms the inlet to the larger end which forms the outlet, the surface of said opening being convoluted to form a spiral surface, the major portion of which is in the form of a spiral surface substantially parallel to the axis of the said opening and non-divergent in the direction in which the opening is divergent, the length of said opening being several times the diameter of the inlet and substantially greater than the diameter of the outlet.

CECIL W. McCREERY.
MILTON W. HATFIELD.

REFERENCES CITED

The following references are of record in the file of this patent:

UNITED STATES PATENTS

| Number | Name | Date |
|---|---|---|
| 877,300 | Czigler | Jan. 21, 1908 |
| 1,711,274 | Manker | Apr. 30, 1929 |
| 1,714,473 | Hepburn | May 21, 1929 |
| 1,964,544 | Trinks | June 26, 1934 |
| 1,981,602 | Levey et al. | Nov. 20, 1934 |
| 2,070,859 | Howe | Feb. 16, 1937 |
| 2,105,819 | Parsons | Jan. 18, 1938 |
| 2,127,742 | Ladd | Aug. 23, 1938 |
| 2,139,770 | Peiler et al. | Dec. 13, 1938 |
| 2,302,751 | Howe | Nov. 24, 1942 |
| 2,339,477 | Hess et al. | Jan. 18, 1944 |
| 2,352,860 | Pasquier | July 4, 1944 |
| 2,368,370 | Maxon | Jan. 30, 1945 |

FOREIGN PATENTS

| Number | Country | Date |
|---|---|---|
| 164,073 | Great Britain | May 30, 1921 |
| 767,795 | France | May 7, 1934 |
| 624,438 | Germany | Jan. 21, 1936 |